(12) United States Patent
Edpalm et al.

(10) Patent No.: US 11,601,674 B2
(45) Date of Patent: *Mar. 7, 2023

(54) ENCODING A PRIVACY MASKED IMAGE

(71) Applicant: Axis AB, Lund (SE)

(72) Inventors: Viktor Edpalm, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 21 days.

This patent is subject to a terminal disclaimer.

(21) Appl. No.: 17/175,423

(22) Filed: Feb. 12, 2021

(65) Prior Publication Data

US 2021/0185355 A1 Jun. 17, 2021

Related U.S. Application Data

(63) Continuation of application No. 15/848,670, filed on Dec. 20, 2017, now Pat. No. 10,924,761.

(30) Foreign Application Priority Data

Dec. 20, 2016 (EP) ..................... 16205466

(51) Int. Cl.
*H04N 19/593* (2014.01)
*H04N 19/172* (2014.01)
(Continued)

(52) U.S. Cl.
CPC .......... *H04N 19/593* (2014.11); *G06T 9/004* (2013.01); *G06V 30/414* (2022.01);
(Continued)

(58) Field of Classification Search
None
See application file for complete search history.

(56) References Cited

U.S. PATENT DOCUMENTS 6,373,530 B1   4/2002  Birks et al.
8,290,042 B2 * 10/2012  Knee ................... H04N 19/132
                                                         382/239

(Continued)

FOREIGN PATENT DOCUMENTS

EP     3 021 583 A1    5/2016

OTHER PUBLICATIONS

"Natural and Synthetic Video in MPEG-4", Ostermann et al.; Proceedings of the 1998 IEEE International Conference on Acoustics, Speech and Signal Processing, Seattle, WA, USA, May 12-15, 1998; pp. 3805-3808, XP010279651.
(Continued)

*Primary Examiner* — Tyler W. Sullivan
(74) *Attorney, Agent, or Firm* — Volpe Koenig

(57) ABSTRACT

A method, system, and non-transitory computer readable medium for encoding a privacy masked image into an encoded image frame of a video stream is disclosed. The encoding comprises receiving pixel divided image data of an image; receiving data defining an area and graphical characteristic of a privacy mask that masks part of the image; extending the privacy mask to be aligned with one or more encoding units having one or more pixels located within the privacy mask to form a redefined privacy mask; generating a privacy masked image by applying the redefined privacy mask and the graphical characteristic of the privacy mask to the image; and encoding the privacy masked image into the encoded image frame of the video stream, wherein the encoding comprises preventing spatial prediction encoding and/or temporal prediction encoding of pixels within the redefined privacy mask of the image in response to certain conditions.

21 Claims, 3 Drawing Sheets

(51) Int. Cl.
*H04N 19/159* (2014.01)
*H04N 19/17* (2014.01)
*H04N 19/167* (2014.01)
*G06T 9/00* (2006.01)
*H04N 19/503* (2014.01)
*H04N 19/61* (2014.01)
*H04N 19/105* (2014.01)
*G06V 30/414* (2022.01)
*H04N 19/132* (2014.01)

(52) U.S. Cl.
CPC ......... *H04N 19/105* (2014.11); *H04N 19/132* (2014.11); *H04N 19/159* (2014.11); *H04N 19/167* (2014.11); *H04N 19/17* (2014.11); *H04N 19/172* (2014.11); *H04N 19/503* (2014.11); *H04N 19/61* (2014.11); *G06T 2210/12* (2013.01)

(56) References Cited

U.S. PATENT DOCUMENTS

| | | | |
|---|---|---|---|
| 8,300,689 B2 * | 10/2012 | Cho | H04N 19/20 375/240.08 |
| 8,965,140 B1 | 2/2015 | Xu et al. | |
| 9,124,762 B2 | 9/2015 | Cutler et al. | |
| 9,332,279 B2 | 5/2016 | Lundberg | |
| 9,536,154 B2 | 1/2017 | Skans et al. | |
| 10,924,761 B2 * | 2/2021 | Edpalm | H04N 19/593 |
| 11,076,156 B2 * | 7/2021 | Edpalm | H04N 19/167 |
| 2001/0033695 A1 | 10/2001 | Okuno et al. | |
| 2006/0064384 A1 | 3/2006 | Mehrotra et al. | |
| 2009/0279798 A1 | 10/2009 | Massimino | |
| 2011/0085035 A1 | 4/2011 | Choi et al. | |
| 2011/0194688 A1 | 8/2011 | Le Barz et al. | |
| 2011/0299781 A1 | 12/2011 | Schoenblum | |
| 2012/0236935 A1 | 9/2012 | Dutt et al. | |
| 2014/0328387 A1 | 11/2014 | Puri et al. | |
| 2015/0264357 A1 | 9/2015 | Alfonso | |
| 2015/0350560 A1 | 12/2015 | Zhou et al. | |
| 2016/0142705 A1 | 5/2016 | Fan et al. | |
| 2017/0195677 A1 | 7/2017 | Ye et al. | |
| 2018/0174414 A1 | 6/2018 | Edpalm et al. | |
| 2018/0176559 A1 | 6/2018 | Lee et al. | |
| 2018/0324436 A1 | 11/2018 | Danielsson Fan | |
| 2019/0124337 A1 | 4/2019 | Ruefenacht et al. | |
| 2020/0051228 A1 * | 2/2020 | Jin | G06T 17/00 |
| 2020/0159961 A1 | 5/2020 | Smith et al. | |

OTHER PUBLICATIONS

"Semantic Video Analysis for Adaptive Content Delivery and Automatic Description", Cavallaro et al., IEEE Transactions on Circuits and Systems for Video Technology, IEEE Service Center, Piscataway, NJ, US, vol. 15, No. 10 (Oct. 1, 2005), pp. 1200-1209, XP011139779.

"Restricted H.264/AVC video coding for privacy protected video scrambling", Dai et al., J. Vis. Commun. Image R. 22 (2011) pp. 479-490.

"Privacy region protection for H.264/AVC with enhanced scrambling effect and a low bitrate overhead", Wang et al., Signal Processing: Image Communication 35 (2015) pp. 71-84.

EP 16205466.2 European Search Report (dated Jul. 18, 2017).

Dufaux, "Video scrambling for privacy protection in video surveillance: recent results and validation framework." Proc. SPIE 8063, Mobile Multimedia/Image Processing, Security, and Applications (2011).

"Restricted H.264/AVC Video Coding for Privacy Protected Video Scrambling", Tong et al., Proceedings of 2010 IEEE 17th International Conference on Image Processing; Sep. 26-29, 2010, Hong Kong, pp. 2089-2092.

* cited by examiner

ENCODING A PRIVACY MASKED IMAGE

CROSS REFERENCE TO RELATED APPLICATION

This application is a continuation of U.S. patent application Ser. No. 15/848,670, filed Dec. 20, 2017, which issued as U.S. Pat. No. 10,924,761 on Feb. 16, 2021, which is incorporated by reference as if fully set forth.

FIELD OF INVENTION

The present teachings relate to privacy masking of images, especially it relates to encoding of privacy masked images.

BACKGROUND

Monitoring cameras are used in many different applications, both indoors and outdoors, for monitoring a variety of environments. Images depicting a captured scene may be monitored by, for example, an operator or a guard. In certain situations, there may be a need to treat one part of a captured image differently from another part, such as when there is a need to mask part of an image in the interest of personal integrity. This may, for instance, occur when a camera is placed inside a building or inside a bus or a train and the environment outside is to be excluded from the monitoring done by the camera. Another example is when a building with windows is monitored and there is a need to avoid monitoring the inside of the building through the window.

In such instances, a privacy mask may be defined by an operator during set-up of the surveillance equipment. A privacy mask may be static or dynamic. A static privacy mask is usually created by an operator marking the area to be masked on the image in a graphical user interface. The static privacy mask then stays in place until the operator decides to move or remove it. A dynamic privacy mask may change over time. Similar to a dynamic privacy mask, the operator may mark an area in the image where masking is desired. The operator may also input settings determining when the privacy mask should be applied. For instance, the operator could draw a rectangle around a window in the image, and make settings such that if a face is detected within the marked area, that face will be masked out. Such dynamic privacy masks may be beneficial in that as long as the conditions set for the privacy mask are not fulfilled, there is no mask blocking the view, but as soon as, for example, a face detection algorithm, an object detection algorithm or a motion detection algorithm detects that the conditions are fulfilled, the privacy mask is applied. Privacy masks may be applied to the image as an overlay. Some privacy masks take the form of a black or otherwise colored, opaque area. Other privacy masks take the form of blurring, where image data is "smeared" out over the privacy mask area, or pixelization, where the image inside the privacy mask is divided into pixelization blocks and all pixels of a pixelization block are given the same value, such that the image appears blocky inside the privacy mask area. The privacy mask is in many cases a rectangle, or it may be another polygon, or have any other shape more closely following the shape of the area to occlude.

When a camera captures images, they are normally transmitted to a site of use, such as a control center, where they may be viewed and/or stored. They may also be stored in so called "edge storage", (i.e., storage at the camera), either on board the camera, such as on an SD-card, or in connection with the camera, such as on a NAS (network attached storage). Before transmission or edge storage, the images are encoded in order to save bandwidth and storage. Encoding may be performed in many different ways, for example, in accordance with the H.264 standard or other encoding standards. Most, if not all, video encoding is lossy, meaning that information present in the original images is lost during encoding and cannot be regained in decoding. There is a trade-off between reduction of the number of bits required for representing the original images and the resulting image quality. Efforts have been made to develop encoding schemes that make as efficient use of the available bits as possible.

However, during encoding an encoder is free to use all available information in both the current and previous images frames (so called prediction encoding). Hence, the encoder may, for example, choose to encode the privacy masked region by referring to another part of the current encoded image frame or a reference image frame, resulting in that the original privacy masked region will have a different appearance than the original privacy masked region when decoded. Specifically, using too clever encoder algorithms or too heavy compression the original privacy masking is likely to be disturbed.

Below some problems with encoding privacy masked images will be discussed.

According to a first scenario: A scene is monitored by a video camera capturing a video sequence of the scene. In the scene all faces in an upper half of the scene is depicted as they are captured by the camera. However, a lower half of the scene has been defined as a privacy zone where detected faces should be privacy masked. A person is walking from the upper half to the lower half of the scene. In a first frame of the scene, wherein the person is located in the upper half of the scene, the face is clearly visible. In a second frame of the scene, wherein the person is located in the lower half of the scene, (i.e., in the defined privacy zone), a privacy mask is applied to the second frame masking the face of the person. That is, the face of the person is hidden or made unidentifiable. When encoding the video comprising the first and second frames, the person would most probably be identified as a moving object in the video and may hence be P-block encoded. In this case encoding with P-blocks referring to the previous frame 1, depicting the face, would make the face clearly visible also in frame 2, even though the privacy mask would be applied to the second image before encoding.

According to a second scenario: A scene is monitored by a video camera capturing a video sequence of the scene. In the scene all faces in a left half of the scene is depicted as they are captured by the camera. However, a right half of the scene has been defined as a privacy zone where detected faces should be privacy masked. A first person standing in the left half of the scene and a second person is standing in the right half of the scene. Hence, in a frame of the scene the face of the second person is privacy masked before encoding the frame. However, upon encoding the unmasked face of the first person may be perceived by the encoder as similar enough to be simply copied to the location of the second persons' face. This will generate a visible face in the no-face privacy zone, and in this case it would not even be the "right" face.

Hence, there is a need for improved encoding of privacy masked images of a video.

SUMMARY

In view of the above, it is an object of the disclosure to provide an improvement in encoding privacy masked images of a video sequence into encoded image frames of a video stream.

According to a first aspect, a method for encoding an image comprising a plurality of pixels into an encoded image frame of a video stream is provided. The method comprising: receiving pixel divided image data of the image, wherein the pixel divided image data represents the pixels of the image; grouping the pixels of the image into encoding units, wherein each encoding unit comprises a plurality of neighboring pixels; receiving data defining a privacy mask and graphical characteristics of the privacy mask; identifying all encoding units having one or more pixels located within the privacy mask; extending the privacy mask to be aligned with the identified encoding units, thereby forming a redefined privacy mask covering the identified encoding units; generating a privacy masked image by applying the redefined privacy mask and the received graphical characteristics to the image; and encoding the privacy masked image into the encoded image frame of the video stream in accordance with the following: disabling spatial prediction encoding of pixels within the redefined privacy mask of the image based on image data related to pixels outside the redefined privacy mask; disabling temporal prediction encoding of pixels within the redefined mask of the image based on image data related to pixels outside any privacy mask of any reference image frame in the video stream; and allowing temporal prediction encoding of pixels within the redefined privacy mask of the image based on image data related to pixels inside a privacy mask of a reference image frame in the video stream.

Hence, the present method is based on redefining the privacy mask such that the privacy mask encoding is defined as comprising all the encoding units that at least partially overlap with the privacy mask to be inserted in the image. Further, the encoder will also be instructed in accordance with the above. Hence, the encoder will be restricted to not allow for any prediction encoding, neither intra or inter, from outside of privacy mask in the present frame or reference frames. However, inter encoding between privacy masked regions of different frame are allowed.

Thus, the risk of contaminating privacy masked region(s) of the privacy masked image in connection with encoding is minimized if not fully removed.

One way to implement the prediction encoding restriction would be to encode privacy masked region(s) of the privacy masked image as a separate slice (and or tile), as no prediction is allowed over these boundaries. Another alternative for implementation would be to set the encoder to solely use intra-encoding units for encoding privacy masked region(s) of the privacy masked image.

The privacy mask of the image and of the reference image frame may further be associated with a classification of the respective privacy mask, wherein the act of allowing temporal prediction encoding may further be based on the classification of the respective privacy mask. For example, further restriction may be set to not use prediction encoding from privacy masked regions with different types or degree of masking. Classifying privacy masked areas allow for increased coding prediction (inter and intra) and therefor increased coding efficiency. Moreover, information from differently classed regions will not be mixed.

The classification of the respective privacy mask may comprise the type of object being masked by the respective privacy mask, wherein the method may further comprise, upon the type of object being masked by the privacy mask of the image and by a privacy mask of the reference image frame being the same, promoting temporal prediction encoding of pixels within the redefined privacy mask of the image based on image data related to pixels inside the privacy mask of the reference image frame. This will allow for more efficient encoding of masked region(s). For example, image data related to a masked face may be reused in another frame. This will make the encoding more efficient, saving both memory and bandwidth.

The classification of the respective privacy mask may comprise a privacy level of the respective privacy mask, wherein the method may further comprise, upon the privacy level of the privacy mask of the image being higher than the privacy level of the privacy mask of the reference image frame, disabling temporal prediction encoding of pixels within the redefined privacy mask of the image based on image data related to pixels inside the privacy mask of the reference image frame.

Reusing information from a region with a higher privacy level than the current region will ensure that privacy mask level is maintained, if not improved, and at the same time provide coding gains. Hence, problems with the encoder reducing the privacy level of a masked region during the encoding and hence disclosing more appearance features than it supposed to is avoided. This may be explained in accordance with the following: assume that one privacy zone (A) is defined such that all faces therein shall be blurred and one privacy zone (B) is defined such that all texts therein shall be blurred. Allowing temporal prediction in between masked objects in privacy zones (A) and (B) would open the possibility of a face in (A) being predicted based on a non-blurred face in (B). According to another example: two privacy masks have different privacy level, for example, one privacy mask is defined as a two-pixel averaging privacy mask and another privacy mask is defined as a 16-pixel averaging privacy mask. Hence one privacy zone (C) is defined as being masked by the two pixel averaging privacy mask and another privacy zone (D) is defined as being masked by the 16-pixel averaging privacy mask. Allowing temporal prediction in between masked objects in privacy (C) and (D) would open the possibility of that pixels in (D) will only be blurred using a two-pixel averaging.

The act of encoding the privacy masked image may further comprise allowing spatial prediction encoding of pixels within the redefined privacy mask of the image based on image frame data related to pixels inside the redefined privacy mask of the image. More efficient encoding will be the result saving both on memory usage and bandwidth.

The privacy mask may comprise a plurality of separate sub privacy mask regions, wherein the act of forming a redefined privacy mask may comprise forming a sub redefined privacy mask for each of the plurality of separate sub privacy mask region, wherein the method may further comprise disabling spatial prediction encoding based on image data related to pixels of different sub redefined privacy masks of the image.

According to a second aspect, an encoding system is provided. The encoding system comprising: an encoder configured to encoded an image into an encoded image frame of a video stream; a data storage configured to store pixel divided image data representing pixels of the image; a pixel grouping module configured to group pixels of the image into encoding units, wherein each encoding unit comprises a plurality of neighboring pixels; an encoding unit module configured to receive data defining a privacy mask and to identify all encoding units having one or more pixels located within the privacy mask; a privacy mask redefining module configured to extend the privacy mask to be aligned with the identified encoding units and thereby form a redefined privacy mask covering the identified encoding units; a privacy masking module configured to receive graphical characteristics of the privacy mask and to generate a privacy masked image by applying the redefined privacy mask and the received graphical characteristics to the image; and an encoder instructor configured to generate encoding instructions for the encoder and to send the encoding instructions to the encoder. Wherein the encoding instructions comprises: disabling spatial prediction encoding of pixels within the redefined privacy mask of the image based on image data related to pixels outside the redefined privacy mask; disabling temporal prediction encoding of pixels within the redefined mask of the image based on image data related to pixels outside any privacy mask of any reference image frame in the video stream; and allowing temporal prediction encoding of pixels within the redefined privacy mask of the image based on image data related to pixels inside a privacy mask of a reference image frame in the video stream; wherein the encoder is configured to receive the encoding instructions and to encode the privacy masked image.

The encoding system may further comprise a privacy mask controller configured to output data defining pixels of the image that is to be covered by the privacy mask within the image and to output graphical characteristics of the privacy mask.

The privacy mask controller may be configured to generate the data defining pixels of the image that is to be covered by the privacy mask based on video analytics provided by a video analytics module.

The privacy mask controller may further be configured to associate a classification with the privacy mask, wherein the encoder instructor may further be configured to base the allowing of temporal prediction encoding on the classification of the privacy mask and a classification of the privacy mask of the reference image frame.

The above mentioned features of the method, when applicable, apply to this second aspect as well. In order to avoid undue repetition, reference is made to the above.

The encoding system may be arranged in a video camera.

According to a third aspect, a non-transitory computer-readable recording medium is provided. The non-transitory computer-readable recording medium having recorded thereon a program for implementing the method according to a method according to the first aspect when executed on a device having processing capabilities.

The above mentioned features of the method and the encoding system, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating embodiments, are given by way of illustration only, since various changes and modifications within the scope of the disclosure will become apparent to those skilled in the art from this detailed description.

Hence, it is to be understood that this disclosure is not limited to the particular component parts of the system described or steps of the methods described as such system and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where:

In FIG. 2A an original privacy mask is illustrated and in FIG. 2B a redefined privacy mask is illustrated.

As illustrated in the FIGS. 1-3, the sizes of layers and regions are exaggerated for illustrative purposes and, thus, are provided to illustrate the general structures of the embodiments. Like reference numerals refer to like elements throughout.

DETAILED DESCRIPTION

The present disclosure will now be described more fully hereinafter with reference to the accompanying drawings, in which embodiments are shown. The teachings of the disclosure may, however, be embodied in many different forms and should not be construed as limited to the embodiments set forth herein; rather, these embodiments are provided for thoroughness and completeness, and to fully convey the scope of the disclosed teachings to the skilled person.

Figure 1:
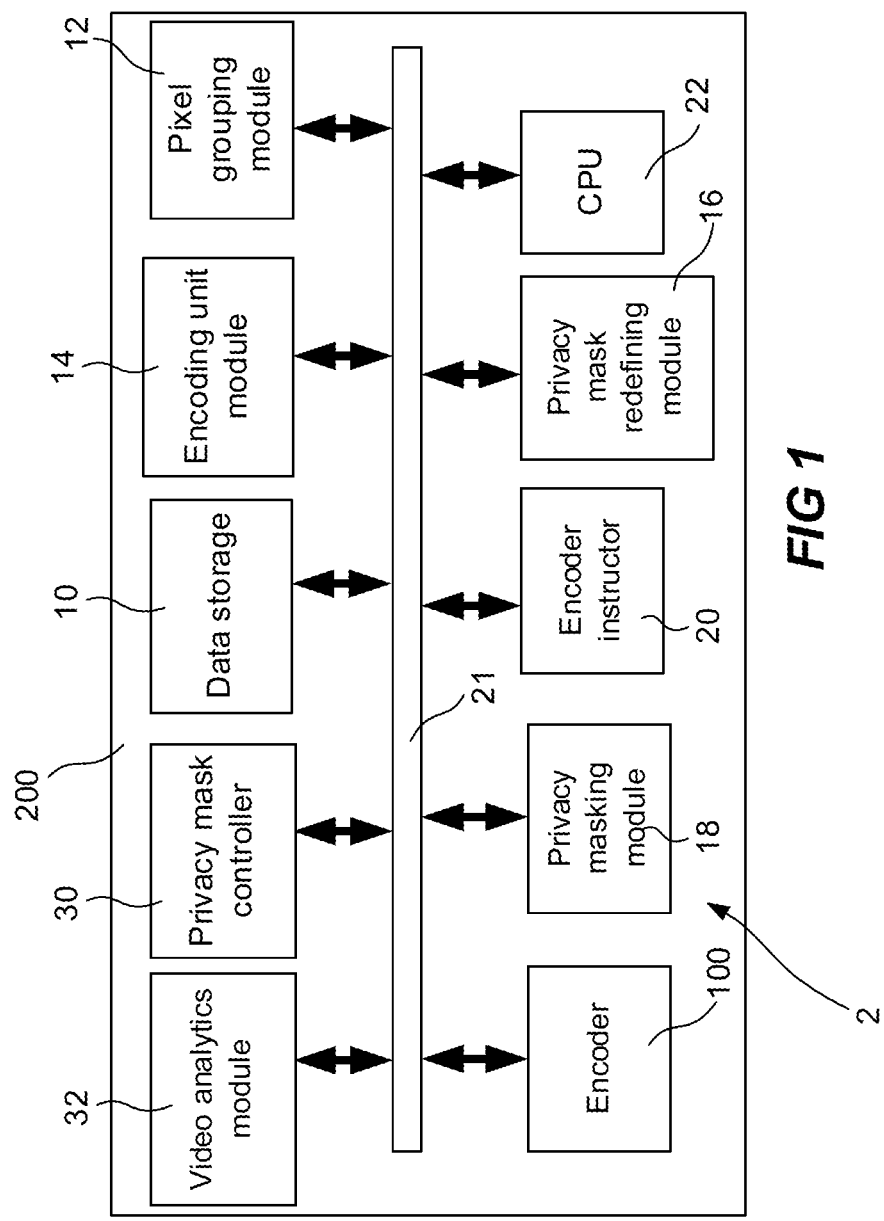
FIG. 1 is a schematic block diagram of an encoding system.

FIG. 1 illustrates an encoding system 200. The encoding system 200 is configured to encode images of a video sequence into encoded image frames of a video stream. The images of the video sequence and the video sequence itself are represented as digital data. Before encoding an image of the video sequence, the encoding system 200 is configured to apply a privacy mask to the image. Hence, the encoding system 200 is configured to encode privacy masked images of a video sequence into encoded image frames of a video stream. The video stream typically comprising intra frames and inter frames. Intra frames are often referred to as I-frames. Inter frames are often referred to as P-frames or B-frames. The encoding system may, for example, be arranged in a video camera. The video camera may, for example, be a network enabled monitoring video camera. Alternatively, the encoding system 200 may be arranged in a device (not shown) connected to an analog video camera. The device may further comprise circuitry configured to transform an analog video signal into images of the video sequence. The encoding system 200 comprises a data storage 10, a pixel grouping module 12, an encoding unit module 14, a privacy mask redefining module 16, a privacy masking module 18, an encoder instructor 20 and an encoder 100. Each of the modules found in the encoding system 200 may be performed by any one or a combination of a processor and a memory containing instructions that are executed by the processor.

The data storage 10 is configured to store digital data. The data storage 10 may be any kind of volatile or non-volatile data storage. Further, the data storage 10 may comprise a plurality of data storage units. At least one of the plurality of data storage units may be used as a buffer memory for buffering data while processing digital data. The data storage 10 may, for example, store digital data representing an image captured by an image sensor of a camera. The digital data may be received from an image processing module which may, for example, have performed processes such as demosaicing, noise filtering, sharpening, and tone mapping on the image captured by the image sensor. Hence, the data storage 10 is configured to store digital data representing the image. The image comprises a plurality of pixels. Accordingly, the digital data representing the image is divided into pixel divided image data. Hence, the pixel divided image data represents the pixels of the image.

The data storage 10, the pixel grouping module 12, the encoding unit module 14, the privacy mask redefining module 16, the privacy masking module 18, the encoded instructor 20 and the encoder may communicate with each other via a data bus 21.

The data storage 10, the pixel grouping module 12, the encoding unit module 14, the privacy mask redefining module 16, the privacy masking module 18, the encoded instructor 20 the data bus 21 and the encoder 100 are comprised in circuitry 2 of the encoding system 200.

One or more of the pixel grouping module 12, the encoding unit module 14, the privacy mask redefining module 16, the privacy masking module 18, the encoded instructor 20 and the encoder 100 may be implemented as a dedicated hardware circuit and/or software module. In case of being software implemented the software may be run on a central processing unit CPU 22 or on a dedicated processing unit. The CPU 22 may be any suitable CPU for performing digital data processing. A dedicated processing unit may be any suitable processing unit for performing digital data processing. It shall also be noted that any dedicated hardware circuit may in part comprise software portions being run on a dedicated processing unit or on the CPU 22. During processing one or more of the pixel grouping module 12, the encoding unit module 14, the privacy mask redefining module 16, the privacy masking module 18, the encoded instructor 20 and the encoder 100 may be configured to store or buffer data in the data storage 10.

The pixel grouping module 12 is configured to access the pixel divided image data representing pixels of the image in the data storage 10. The pixel grouping module 12 is configured to group pixels of the image into encoding units. Each encoding unit comprises a plurality of neighboring pixels. Encoding units may be described in a plurality of ways depending in the encoding method used. For example, using H.264 encoding, an encoding unit is a macro block, using H.265 encoding an encoding unit is a coding tree unit. Hence, it is realized that encoding units may be named different things depending on the encoding method used. Grouping the pixels of an image into encoding units may also be made in different ways depending on encoding method used. Many such ways are known to the person skilled in the art and will not be discussed herein in more detail. The pixel grouping module 12 is configured to send data pertaining to the encoding units of the image to the encoding unit module 14. Alternatively or in combination, the pixel grouping module 12 is configured to store data pertaining to the encoding units of the image in the data storage 10.

The encoding unit module 14 is configured to receive data defining a privacy mask. The encoding unit module 14 is configured receive data pertaining to the encoding units of the image from the pixel grouping module 12. Alternatively or in combination, the encoding unit module 14 is configured retrieve data pertaining to the encoding units of the image from the data storage 10. The encoding unit module 14 is further configured to identify all encoding units having one or more pixels located within the privacy mask. Hence, the encoding unit module 14 is configured to identify all encoding units that at least partly overlap with the privacy mask to be inserted into the image.

The encoding unit module 14 is configured to send data pertaining to encoding units having one or more pixels located within the privacy mask to the privacy mask redefining module 16. Data pertaining to encoding units having one or more pixels located within the privacy mask may, for example, be image coordinates for these encoding units or image coordinates defining an area of the image enclosing these encoding units. Alternatively or in combination, encoding unit module 14 is configured to store data pertaining to encoding units having one or more pixels located within the privacy mask in the data storage 10.

The data defining the privacy mask may be received from a privacy mask controller 30. Hence, the encoding system 200 may further comprise the privacy mask controller 30. The privacy mask controller 30 is configured to control which pixels of the image that are to be masked by the privacy mask. Hence, the data defining the privacy mask comprises pixels of the image that is to be masked by the privacy mask. According to a non-limiting example, the data defining the privacy mask comprises image coordinates identifying a region within the image which should be privacy masked.

The privacy mask controller 30 may receive input from a video analytics module 32 detecting objects that are to be privacy masked. Non-limiting examples of a video analytics module 32 are a moving object detector, a face detector and license plate detector. According to a non-limiting example, the data defining the privacy mask may comprise image coordinates tracing a silhouette of the detected object. Alternatively, the data defining the privacy mask may comprise image coordinates of a bounding box comprising the detected object.

The privacy mask controller 30 may receive input from an operator. The input from the operator may define a privacy zone in a camera view where the analytics modules detecting objects that are to be privacy masked shall detect the objects. Alternatively, the whole view could be of interest.

The privacy mask controller 30 may be implemented as a dedicated hardware circuit and/or software module. In case of being software implemented the software may be run on the central processing unit CPU 22 or on a dedicated processing unit. The dedicated processing unit may be any suitable processing unit for performing digital data processing. It shall also be noted that any dedicated hardware circuit may in part comprise software portions being run on a dedicated processing unit or on the CPU 22. During processing the privacy mask controller 30 may be configured to store or buffer data in the data storage 10.

The video analytics module 32 may be implemented as a dedicated hardware circuit and/or software module. In case of being software implemented the software may be run on the central processing unit CPU 22 or on a dedicated processing unit. The dedicated processing unit may be any suitable processing unit for performing digital data processing. It shall also be noted that any dedicated hardware circuit may in part comprise software portions being run on a dedicated processing unit or on the CPU 22. During processing the video analytics module 32 may be configured to store or buffer data in the data storage 10.

One or both of the privacy mask controller 30 and the video analytics module 32 may be comprised in the circuitry 2.

The pixels of the image that are to be covered by the privacy mask may be grouped into one single privacy mask region. Hence, the privacy mask comprises a single privacy mask region. Alternatively, the pixels of the image that are to be covered by the privacy mask may be grouped into a plurality of separate sub privacy mask regions. Sub privacy mask regions may be privacy mask regions for different objects, Alternatively or in combination, sub privacy mask regions may be privacy mask regions for different parts of one object. Hence, the privacy mask comprises a plurality of sub privacy mask regions. The privacy mask region may be rectangular or other shape. The sub privacy mask regions may be rectangular or other shape.

The privacy mask controller 30 may further be configured to determine the graphical characteristics of the privacy mask. Hence, the data defining the privacy mask may further comprise graphical characteristics of the privacy mask. Non-limiting examples of graphical characteristics are constant coloring (e.g., by a black box), smearing or pixelization. Hence, the privacy mask may take different forms. By constant coloring is meant the privacy masked region of the image is blacked or otherwise colored. By smearing is meant replacing the pixel value of each pixel with an average of pixel values in a neighborhood of the pixel in question, (i.e., applying a rather heavy-handed noise filter). By pixelization is meant that pixels within the privacy mask region are grouped into pixelization groups of neighboring pixels. A pixelization group of neighboring pixels may, for example, be a macro block. A pixel value of each pixel of a respective pixelization group is set to a common pixel value representative of the respective pixelization group. Both pixelization and smearing are sometimes referred to as blurring.

The privacy mask controller 30 may further be configured to associate a classification with the privacy mask.

The classification of the privacy mask may comprise a type of object that is to be masked by the privacy mask. Different types of objects may be faces, license plates, moving objects, persons, windows, etc. The type of an object may be identified using the one or more video analytics modules. Moreover, the classification of a privacy mask also may be connected to a privacy zone as defined by an operator. Privacy masks in a defined privacy zone may be associated with a first specific class and privacy masks in another defined privacy zone may be associated with another specific class.

Alternatively or in combination, the classification of the privacy mask may comprise a privacy level of the privacy mask. According to a non-limiting example faces may always have a high privacy level. The privacy level is a measure of the number of features that may be disclosed in the privacy masked region of the privacy masked image.

According to a non-limiting example, the highest privacy level is a constant coloring mask (hence all information in the privacy mask region of the privacy masked image is removed). The next privacy level or privacy levels may then be a pixelated mask. The size of the pixelization groups of neighboring pixels determines the privacy level of the mask. The smaller the pixelization group of neighboring pixels is, the lower the privacy level becomes. When using pixelization the privacy level may also be associated with the relation between the size of the object to be privacy masked in the image and the size of the pixelization group.

Hence, a privacy level may be associated with a particular graphical characteristic of the privacy mask to be applied to the privacy mask region of the image to be privacy masked. For example, a privacy mask having a constant coloring as the graphical characteristic may have higher privacy level than privacy mask having blurring as the graphical characteristic. Alternatively or in combination, a rectangle shaped privacy mask may have higher privacy level than a privacy mask following the contours of the object to be privacy masked.

The privacy mask redefining module 16 is configured receive data pertaining to encoding units having one or more pixels located within the privacy mask from the encoding unit module 14. Alternatively or in combination, the privacy mask redefining module 16 is configured to retrieve data pertaining to encoding units having one or more pixels located within the privacy mask from the data storage 10. The privacy mask redefining module 16 is configured to extend the privacy mask to be aligned with the encoding units having one or more pixels located within the privacy mask. Hence, the privacy mask redefining module 16 is configured to extend the privacy mask to be aligned with the encoding units identified by the encoding unit module 14. Thereby, the privacy mask redefining module 16 is configured to form a redefined privacy mask covering the identified encoding units. Hence, the privacy mask redefining module 16 is configured to resize the privacy mask such that the redefined privacy mask covers full encoding units. Further, upon the privacy mask comprises a plurality of sub privacy mask regions the privacy mask redefining module 16 is configured to form a sub redefined privacy mask for each of the plurality of sub privacy mask regions.

The privacy mask redefining module 16 is configured to send data defining the redefined privacy mask to the privacy masking module 18. Image coordinates describing the vertices of the redefined mask in the image may be used for defining the redefined mask. Alternatively or in combination, privacy mask redefining module 16 is configured to store data defining the redefined privacy mask in the data storage 10.

Figure 2A:
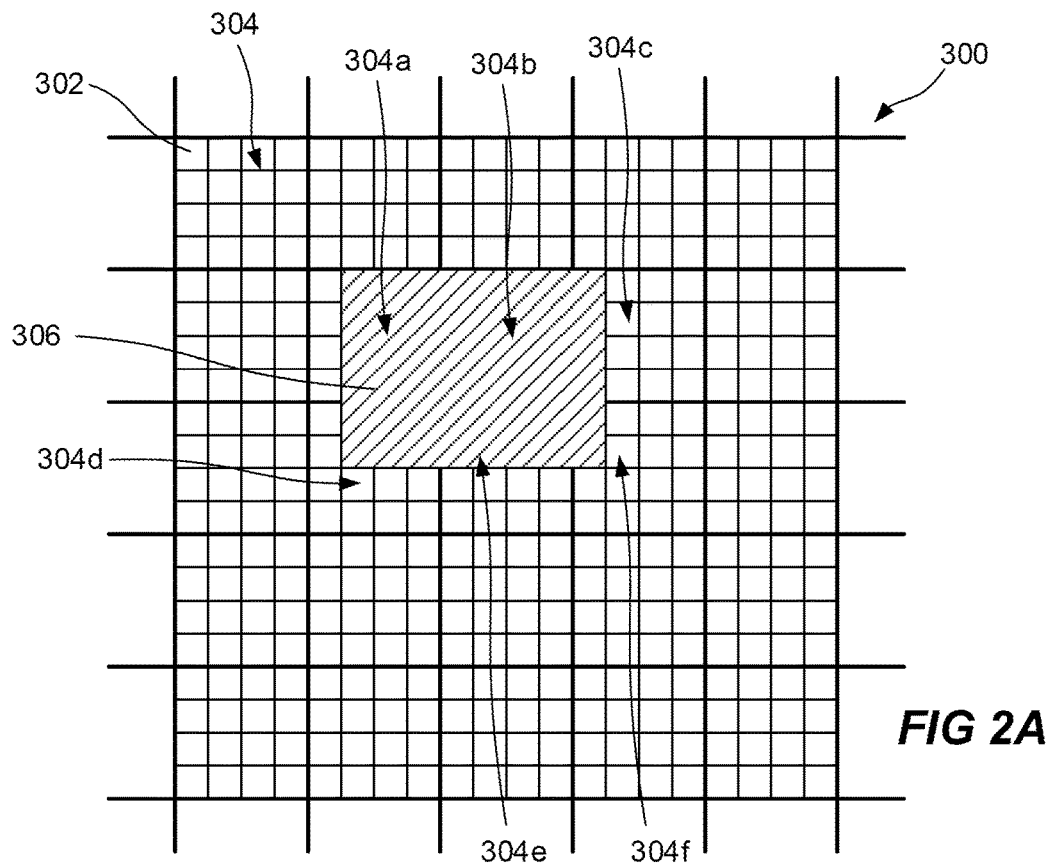
FIGS. 2A and 2B are schematic illustrations of an image and a privacy mask to cover the image.
Figure 2B:
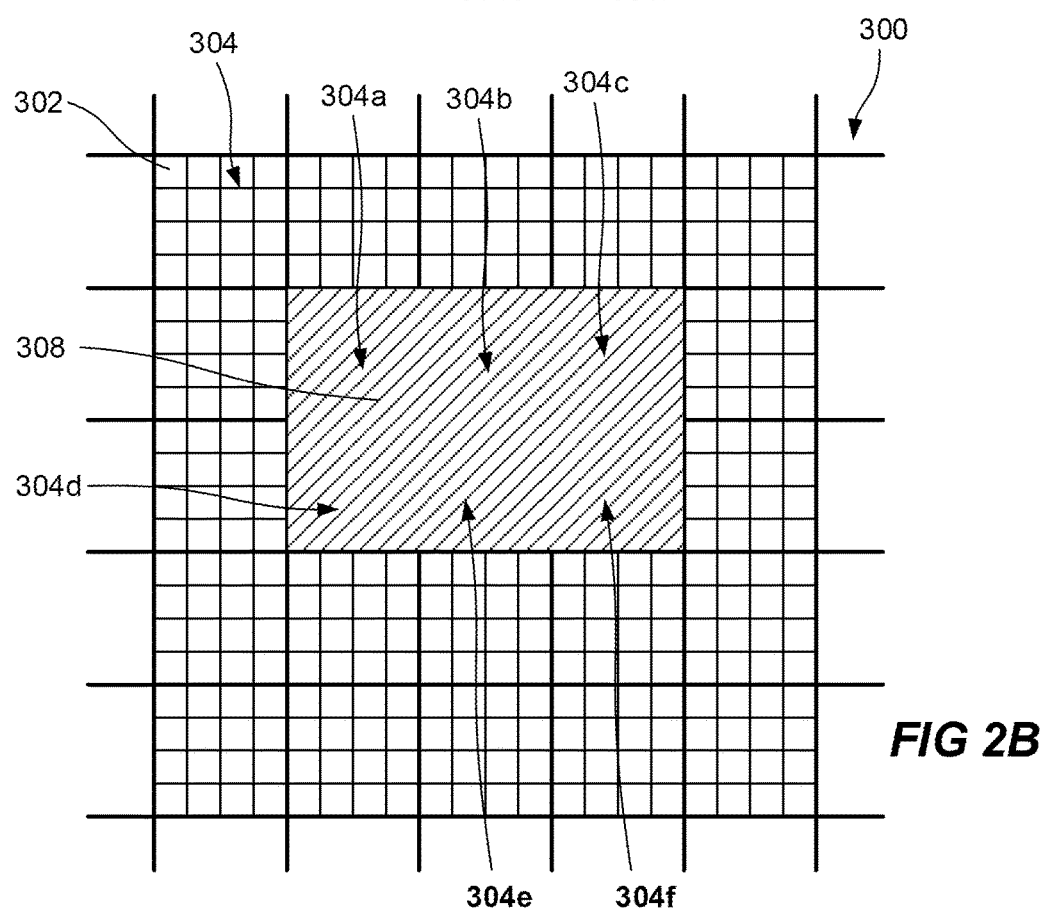

The redefining of the privacy mask is schematically illustrated in FIGS. 2A and 2B. In FIGS. 2A and 2B a portion of an image 300 divided into pixels 302 is illustrated. The pixels 302 of the image 300 are further grouped into encoding units 304. The privacy mask 306 as outputted by the privacy mask controller 30 is illustrated in FIG. 2A. According to this example, the privacy mask 306 covers pixels belonging to the encoding units 304*a-f*. In other words, the privacy mask 306 at least party overlap with the encoding units 304*a-f*. The redefined privacy mask 308 is illustrated as the area fully covering encoding units 304*a-f* in FIG. 2B. As seen in FIG. 2B the redefined privacy mask 308 is covering full encoding units 304.

The privacy masking module 18 is configured to receive graphical characteristics of the privacy mask from the privacy mask controller 30. The privacy masking module 18 is further configured to receive data defining the redefined privacy mask from the privacy mask redefining module 16. Alternatively or in combination, the privacy masking module 18 is configured to retrieve data defining the redefined privacy mask from the data storage 10. The privacy masking module 18 is further configured to generate a privacy masked image by applying the redefined privacy mask and the received graphical characteristics to the image.

The privacy masking module 18 is configured to send data pertaining to the privacy masked image to the encoder 100. The data pertaining to the privacy masked image is preferable digital data. The privacy masked image comprises a plurality of pixels. Accordingly, the digital data representing the privacy masked image is divided into pixel divided image data. Hence, the pixel divided image data represents the pixels of the privacy masked image. Alternatively or in combination, privacy masking module 18 is configured to store data pertaining to the privacy masked image in the data storage 10.

The encoder instructor 20 is configured to retrieve data pertaining to the privacy masked image, data defining the redefined privacy mask, data pertaining to encoding units having one or more pixels located within the privacy mask data from the storage 10. Alternatively or in combination, the encoder instructor 20 is configured to receive one or more of these data from the respective module 14, 16, 18 configured to generate the respective data.

The encoder instructor 20 is configured to generate encoding instructions for the encoder 100 to encode the image into an encoded image frame of the video stream. The encoding instructions comprises disabling spatial and temporal prediction encoding of pixels within the redefined privacy mask of the image based on image data related to pixels outside any privacy mask of the current image frame or any reference image frame. Hence, the encoding instructions comprises disabling spatial prediction encoding of pixels within the redefined privacy mask of the image based on image data related to pixels outside the redefined privacy mask; and disabling temporal prediction encoding of pixels within the redefined mask of the image based on image data related to pixels outside any privacy mask of any reference image frame in the video stream. The encoding instructions may further comprise allowing temporal prediction encoding of pixels within the redefined privacy mask of the image based on image data related to pixels inside a privacy mask of a reference image frame in the video stream.

The encoder instructor 20 may further be configured to base the allowing of temporal prediction encoding on the classification of the privacy mask and a classification of the privacy mask of the reference image frame.

There are many scenarios on how the encoder instructor 20 may further be configured to base the allowing of temporal prediction encoding on classification.

According to one example, the classification comprises the type of object that is to be masked by the privacy mask. In this example, upon the type of object being masked by the privacy mask of the image and the type of object being masked by a privacy mask of the reference image frame are the same, the encoder instructor 20 is configured to generate encoding instructions for promoting temporal prediction encoding of pixels within the redefined privacy mask of the image based on image data related to pixels inside the privacy mask of the reference image frame. Hence, for classification based on type of object temporal prediction encoding between two privacy masks masking the same type of object is promoted. This in order to make the encoding more efficient and at the same time still ensuring the privacy of the masked areas.

According to another example, the classification comprises the privacy level of the privacy mask. In this example, upon the privacy level of the privacy mask of the image being higher than the privacy level of the privacy mask of the reference image frame, the encoder instructor 20 is configured to generate encoding instructions for disabling temporal prediction encoding of pixels within the redefined privacy mask of the image based on image data related to pixels inside the privacy mask of the reference image frame. Consequently, upon the privacy level of the privacy mask of the image being equal or lower than the privacy level of the privacy mask of the reference image frame, the encoder instructor 20 is configured to generate encoding instructions for promoting temporal prediction encoding of pixels within the redefined privacy mask of the image based on image data related to pixels inside the privacy mask of the reference image frame.'

The encoder instructor 20 is further configured to send the encoding instructions to the encoder 100.

The encoder 100 is configured to receive the encoding instructions from the encoder instructor 20. The encoder 100 is further configured to receive data pertaining to the privacy masked image from the privacy masking module 18. Alternatively or in combination, the encoder 100 is further configured to retrieve data pertaining to the privacy masked image from the data storage 10. The encoder 100 is further configured to encode the privacy masked image in accordance with the encoding instructions.

Figure 3:
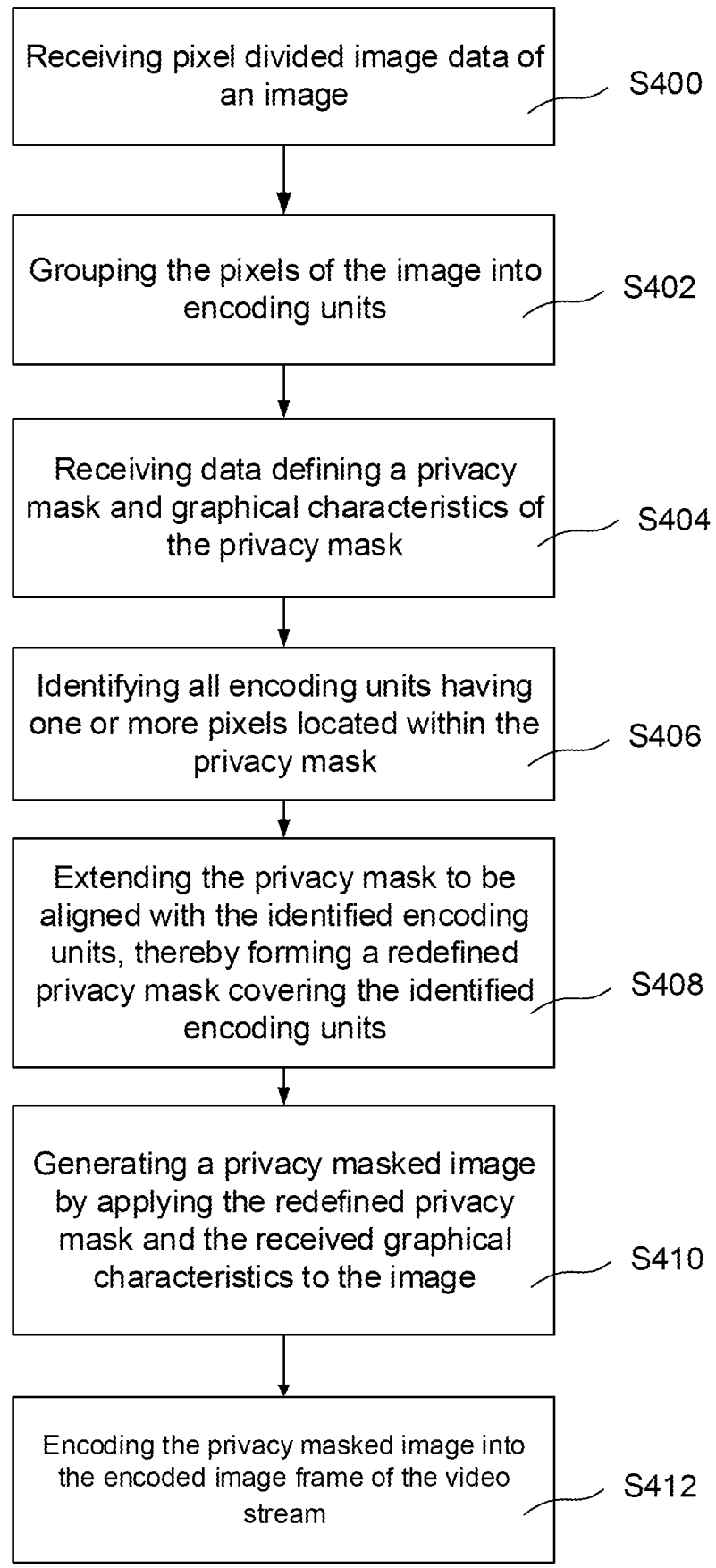
FIG. 3 is a block scheme of a method for encoding an image comprising a plurality of pixels into an encoded image frame of a video stream.

With reference to FIG. 3 a method for encoding an image comprising a plurality of pixels into an encoded image frame of a video stream will be discussed. The method comprises:

Receiving S400 pixel divided image data of the image, wherein the pixel divided image data represents the pixels of the image;

Grouping S402 the pixels of the image into encoding units, wherein each encoding unit comprises a plurality of neighboring pixels;

Receiving S404 data defining a privacy mask and graphical characteristics of the privacy mask;

Identifying S406 all encoding units having one or more pixels located within the privacy mask;

Extending S408 the privacy mask to be aligned with the identified encoding units, thereby forming a redefined privacy mask covering the identified encoding units;

Generating S410 a privacy masked image by applying the redefined privacy mask and the received graphical characteristics to the image; and Encoding S412 the privacy masked image into the encoded image frame of the video stream. Wherein the act of encoding S412 is performed according to the following encoding instructions:

disabling spatial prediction encoding of pixels within the redefined privacy mask of the image based on image data related to pixels outside the redefined privacy mask;

disabling temporal prediction encoding of pixels within the redefined mask of the image based on image data related to pixels outside any privacy mask of any reference image frame in the video stream; and allowing temporal prediction encoding of pixels within the redefined privacy mask of the image based on image data related to pixels inside a privacy mask of a reference image frame in the video stream.

The method may further comprise, upon the privacy mask of the image and the privacy mask of the reference image frame are further associated with a classification of the respective privacy mask, the act of allowing temporal prediction encoding is further based on the classification of the respective privacy mask.

The method may further comprise, upon the classification of the respective privacy mask comprises a type of object being masked by the respective privacy mask, and upon the type of object being masked by the privacy mask of the image and by the privacy mask of the reference image frame being the same, promoting temporal prediction encoding of pixels within the redefined privacy mask of the image based on image data related to pixels inside the privacy mask of the reference image frame.

The method may further comprise, upon the classification of the respective privacy mask comprises a privacy level of the respective privacy mask, and upon the privacy level of the privacy mask of the image being higher than the privacy level of the privacy mask of the reference image frame, disabling temporal prediction encoding of pixels within the redefined privacy mask of the image based on image data related to pixels inside the privacy mask of the reference image frame.

The person skilled in the art realizes that the present teachings by no means is limited to the preferred embodiments described above. On the contrary, many modifications and variations are possible within the scope of the appended claim.

For example, the encoder instructor 20 may further be configured to generate encoding instructions allowing spatial prediction encoding of pixels within the redefined privacy mask of the image based on image frame data related to pixels inside the redefined privacy mask of the image.

Upon the privacy mask comprises a plurality of sub privacy mask regions, the encoder instructor 20 may further be configured to generate encoding instructions disabling spatial prediction encoding based on image data related to pixels of different sub redefined privacy masks of the image. However, in this case the encoder instructor 20 may further be configured to generate encoding instructions allowing spatial prediction encoding of pixels within a sub redefined privacy mask of the image based on image frame data related to pixels inside the sub redefined privacy mask of the image.

Moreover, the encoder instructor 20 may further be configured to generate encoding instructions to generate a new I-frame when a new privacy mask is generated in order to force a fresh start for the encoding of the privacy mask.

Furthermore, the encoder instructor 20 may further be configured to generate encoding instructions to not allow deblocking on the boundary of the privacy mask.

Additionally, variations to the disclosed embodiments can be understood and effected by the skilled person in practicing the claimed teachings from a study of the drawings, the disclosure, and the appended claims.

What is claimed is:

1. A method for encoding a privacy masked image, the method comprising:
    receiving pixel divided image data of an image, wherein the pixel divided image data is grouped into a plurality of encoding units;
    receiving data defining an area and graphical characteristic of a privacy mask that masks part of the image, the graphical characteristic of the privacy mask indicating the manner in which pixel values of pixels located within the privacy mask are determined;
    extending the privacy mask and the graphical characteristic of the privacy mask to be aligned with one or more encoding units having one or more pixels located within the privacy mask to form a redefined privacy mask;
    generating a privacy masked image by applying the redefined privacy mask and the graphical characteristic of the privacy mask to the image; and
    encoding the privacy masked image into an encoded image frame of a video stream,
    wherein the encoding comprises disabling spatial prediction encoding of pixels within the redefined privacy mask of the image on a condition that the spatial prediction encoding the pixels within the redefined privacy mask of the image uses image data related to pixels outside of the redefined privacy mask, and
    wherein the encoding comprises disabling temporal prediction encoding of pixels within the redefined privacy mask of the image on a condition that the temporal prediction encoding the pixels within the redefined privacy mask of the image uses image data related to pixels outside of one or more privacy masks of any reference frame in the video stream.

2. The method of claim 1, wherein the encoding further comprises performing spatial prediction encoding of pixels within the redefined privacy mask of the image in response to the encoding of pixels within the redefined privacy mask of the image using image data related to pixels inside of the redefined privacy mask.

3. The method of claim 1, wherein the encoding further comprises performing temporal prediction encoding of pixels within the redefined privacy mask of the image using image data related to pixels inside of the one or more privacy masks of any reference frame in the video stream.

4. The method of claim 1, further comprising associating the privacy mask of the image and the one or more privacy masks of any reference frame with a classification, wherein the classification of the privacy mask comprises any one or a combination of an object identification of the object being masked by a respective privacy mask and a privacy level indicating a measure of features that may be disclosed in the privacy masked region of a respective privacy mask where a higher privacy level provides more masking than a lower privacy level.

5. The method of claim 4, wherein the encoding further comprises disabling spatial prediction encoding of pixels within the redefined privacy mask of the image based on the classification of the privacy mask of the image and the classification of the one or more privacy masks of any reference image frame.

6. The method of claim 4, wherein the encoding further comprises disabling temporal prediction encoding of pixels within the redefined privacy mask of the image based on the classification of the privacy mask of the image and the classification of the one or more privacy masks of any reference image frame.

7. The method of claim 4, wherein the encoding further comprises performing temporal prediction encoding of pixels within the redefined privacy mask of the image based on image data related to pixels inside the privacy mask of the reference image frame in response to the object identification of the object being masked by the privacy mask of the image and the privacy mask of the reference image being the same.

8. The method of claim 4, wherein the encoding further comprises disabling temporal prediction encoding of pixels within the redefined privacy mask of the image on a condition that the temporal prediction encoding of pixels within the redefined privacy mask of the image uses image data related to pixels inside the privacy mask of the reference image frame and the privacy level of the privacy mask of the image is higher than the privacy level of the privacy mask of the reference image frame.

9. The method of claim 1, wherein each encoding unit comprises a plurality of pixels.

10. The method of claim 1, wherein the graphical characteristic of the privacy mask comprises any one or a combination of constant coloring, smearing, or pixelization.

11. A system comprising:
- circuitry configured to receive pixel divided image data of an image, wherein the pixel divided image data is grouped into a plurality of encoding units;
- circuitry configured to receive data defining an area and graphical characteristic of a privacy mask that masks part of the image, the graphical characteristic of the privacy mask indicating the manner in which pixel values of pixels located within the privacy mask are determined;
- circuitry configured to extend the privacy mask and the graphical characteristic of the privacy mask to be aligned with one or more encoding units having one or more pixels located within the privacy mask to form a redefined privacy mask;
- circuitry configured to generate a privacy masked image by applying the redefined privacy mask and the graphical characteristic of the privacy mask to the image; and
- circuitry configured to encode the privacy masked image into an encoded image frame of a video stream,
- wherein the encoding comprises disabling spatial prediction encoding of pixels within the redefined privacy mask of the image on a condition that the spatial prediction encoding the pixels within the redefined privacy mask of the image uses-image data related to pixels outside of the redefined privacy mask, and
- wherein the encoding comprises disabling temporal prediction encoding of pixels within the redefined privacy mask of the image on a condition that the temporal prediction encoding the pixels within the redefined privacy mask of the image uses image data related to pixels outside of one or more privacy masks of any reference frame in the video stream.

12. The system of claim 11, wherein the encoding further comprises performing spatial prediction encoding of pixels within the redefined privacy mask of the image in response to the encoding of pixels within the redefined privacy mask of the image using image data related to pixels inside of the redefined privacy mask.

13. The system of claim 11, wherein the encoding further comprises performing temporal prediction encoding of pixels within the redefined privacy mask of the image using image data related to pixels inside of the one or more privacy masks of any reference frame in the video stream.

14. The system of claim 11, further comprising circuitry configured to associate the privacy mask of the image and the one or more privacy masks of any reference frame with a classification, wherein the classification of the privacy mask comprises any one or a combination of an object identification of the object being masked by a respective privacy mask and a privacy level indicating a measure of features that may be disclosed in the privacy masked region of a respective privacy mask where a higher privacy level provides more masking than a lower privacy level.

15. The system of claim 14, wherein the encoding further comprises disabling spatial prediction encoding of pixels within the redefined privacy mask of the image based on the classification of the privacy mask of the image and the classification of the one or more privacy masks of any reference image frame.

16. The system of claim 14, wherein the encoding further comprises disabling temporal prediction encoding of pixels within the redefined privacy mask of the image based on the classification of the privacy mask of the image and the classification of the one or more privacy masks of any reference image frame.

17. The system of claim 14, wherein the encoding further comprises performing temporal prediction encoding of pixels within the redefined privacy mask of the image based on image data related to pixels inside the privacy mask of the reference image frame in response to the object identification of the object being masked by the privacy mask of the image and the privacy mask of the reference image being the same.

18. The system of claim 14, wherein the encoding further comprises disabling temporal prediction encoding of pixels within the redefined privacy mask of the image on a condition that the temporal prediction encoding of pixels within the redefined privacy mask of the image uses image data related to pixels inside the privacy mask of the reference image frame and the privacy level of the privacy mask of the image is higher than the privacy level of the privacy mask of the reference image frame.

19. The system of claim 11, wherein the graphical characteristic of the privacy mask comprises any one or a combination of constant coloring, smearing, or pixelization.

20. A non-transitory computer-readable medium having recorded thereon instructions, which when executed by a computing device is configured to cause the device to perform operations for encoding a privacy masked image, the operations comprising:
- receiving pixel divided image data of an image, wherein the pixel divided image data is grouped into a plurality of encoding units;
- receiving data defining an area and graphical characteristic of a privacy mask that masks part of the image, the graphical characteristic of the privacy mask indicating the manner in which pixel values of pixels located within the privacy mask are determined;
- extending the privacy mask and the graphical characteristic of the privacy mask to be aligned with one or more encoding units having one or more pixels located within the privacy mask to form a redefined privacy mask;
- generating a privacy masked image by applying the redefined privacy mask and the graphical characteristic of the privacy mask to the image; and
- encoding the privacy masked image into an encoded image frame of a video stream,
- wherein the encoding comprises disabling spatial prediction encoding of pixels within the redefined privacy mask of the image on a condition that the spatial prediction encoding the pixels within the redefined privacy mask of the image uses-image data related to pixels outside of the redefined privacy mask, and
- wherein the encoding comprises disabling temporal prediction encoding of pixels within the redefined privacy mask of the image on a condition that the temporal prediction encoding the pixels within the redefined privacy mask of the image uses image data related to pixels outside of one or more privacy masks of any reference frame in the video stream.

21. The non-transitory computer-readable medium of claim 20, wherein the graphical characteristic of the privacy mask comprises any one or a combination of constant coloring, smearing, or pixelization.

* * * * *

UNITED STATES PATENT AND TRADEMARK OFFICE
CERTIFICATE OF CORRECTION

PATENT NO. : 11,601,674 B2
APPLICATION NO. : 17/175423
DATED : March 7, 2023
INVENTOR(S) : Edpalm et al.

It is certified that error appears in the above-identified patent and that said Letters Patent is hereby corrected as shown below:

In the Claims

In Claim 1, at Column 14, Line 11, after the word "reference" insert therefor --image--

In Claim 3, at Column 14, Line 22, after the word "reference" insert therefor --image--

In Claim 4, at Column 14, Line 25, after the word "reference" insert therefor --image--

In Claim 4, at Column 14, Line 29, after the word "in" delete the word "the" and insert therefor --a--

In Claim 7, at Column 14, Line 51, after the word "image" insert therefor --frame--

In Claim 11, at Column 15, Line 33, after the word "reference" insert therefor --image--

In Claim 13, at Column 15, Line 44, after the word "reference" insert therefor --image--

In Claim 14, at Column 15, Line 47, after the word "reference" insert therefor --image--

In Claim 17, at Column 16, Line 10, after the word "image" insert therefor --frame--

In Claim 20, Column 16, Line 59, after the word "reference" insert therefor --image--

Signed and Sealed this
Eleventh Day of April, 2023

*Katherine Kelly Vidal*

Katherine Kelly Vidal
*Director of the United States Patent and Trademark Office*